(12) United States Patent
Fulton et al.

(10) Patent No.: US 10,104,409 B2
(45) Date of Patent: *Oct. 16, 2018

(54) METHODS AND SYSTEMS FOR SEGMENTING DATA AND PERFORMING ANALYSIS

(71) Applicant: Discovery Communications, LLC, Silver Spring, MD (US)

(72) Inventors: Elizabeth Rockwood Fulton, New York, NY (US); David Ernst, Norwalk, CT (US); Steve Ozzano, Darien, CT (US)

(73) Assignee: DISCOVERY COMMUNICATIONS, LLC, Silver Spring, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/639,763

(22) Filed: Jun. 30, 2017

(65) Prior Publication Data

US 2017/0302980 A1    Oct. 19, 2017

Related U.S. Application Data

(63) Continuation of application No. 14/835,300, filed on Aug. 25, 2015, now Pat. No. 9,729,908, which is a (Continued)

(51) Int. Cl.
| | |
|---|---|
| *H04N 7/10* | (2006.01) |
| *H04N 7/025* | (2006.01) |
| *H04N 21/25* | (2011.01) |
| *H04N 21/45* | (2011.01) |
| *H04N 21/258* | (2011.01) |
| *H04N 21/658* | (2011.01) |
| *H04N 21/845* | (2011.01) |
| *H04N 21/2668* | (2011.01) |
| *H04N 21/81* | (2011.01) |

(52) U.S. Cl.
CPC ..... *H04N 21/252* (2013.01); *H04N 21/25883* (2013.01); *H04N 21/2668* (2013.01); *H04N 21/4532* (2013.01); *H04N 21/6582* (2013.01); *H04N 21/812* (2013.01); *H04N 21/8456* (2013.01)

(58) Field of Classification Search
CPC combination set(s) only.
See application file for complete search history.

(56) References Cited

U.S. PATENT DOCUMENTS

| | | |
|---|---|---|
| 8,554,602 B1 | 10/2013 | Zohar et al. |
| 2009/0150198 A1* | 6/2009 | Volovich ............ G06Q 30/02 705/7.32 |

(Continued)

*Primary Examiner* — Mulugeta Mengesha
(74) *Attorney, Agent, or Firm* — Bookoff McAndrews, PLLC

(57) ABSTRACT

Apparatus and methods for segmenting television audience data are disclosed. The methods include receiving program level viewing data for one or more individuals. The methods also include creating one or more segments for the one or more individuals based upon the program level viewing data. The methods further include combining the one or more segments into one or more groups by applying a grouping function and performing analysis on the one or more groups, and generating reports based upon the analysis.

11 Claims, 11 Drawing Sheets

Related U.S. Application Data continuation of application No. 13/179,218, filed on Jul. 8, 2011, now Pat. No. 9,148,680.

(60) Provisional application No. 61/363,083, filed on Jul. 9, 2010.

(56) References Cited

U.S. PATENT DOCUMENTS

| | | | | |
|---|---|---|---|---|
| 2010/0011020 A1* | 1/2010 | Bouzid | ............... | G06F 17/30 707/E17.046 |
| 2010/0269134 A1* | 10/2010 | Storan | ............... | G06Q 30/02 725/34 |

* cited by examiner

METHODS AND SYSTEMS FOR SEGMENTING DATA AND PERFORMING ANALYSIS

CROSS-REFERENCE TO RELATED APPLICATIONS

This application is a continuation of U.S. application Ser. No. 14/835,300, filed Aug. 25, 2015, which is a continuation of U.S. application Ser. No. 13/179,218, (now U.S. Pat. No. 9,148,680), filed on Jul. 8, 2011, which claims priority to U.S. Provisional Application No. 61/363,083, titled "Methods and Systems for Segmenting Data and Performing Analysis," filed on Jul. 9, 2010, all of which are herein incorporated by reference in their entireties.

BACKGROUND

Field of the Invention

Aspects of the present invention relate to methods and systems for segmenting data and performing analysis on the segmented data. In particular, aspects of the present invention relate to segmenting television audience data based on the audience's viewing patterns through the use of audience data.

Background of the Related Art

Typically, in researching television audiences' viewing patterns, companies, such as Nielsen Media Research, capture respondent level data for the members of their national people meter panel, e.g., raw data, by monitoring which television programs television audiences are viewing during a particular time period. Thus, it is possible to gather, for any given time period, information regarding which television programs a viewer is watching (alternatively referred to herein as "audience data"). Advertising agencies and media companies generally use this audience data to plan and transact deals for commercial advertising time and to decide what products to advertise during television programming. However, the data used by the companies is typically based upon broad generalizations and/or groupings of demographic information associated with the audience data. Thus, the relevancy of the advertising messages may not be optimized to a majority of the viewers watching the television program at a given time.

In addition, in researching television audiences' viewing patterns, data may be gathered using surveys asking television viewers questions regarding the amount of television each viewer watches and/or the types of programs the viewer watches. These surveys capture the viewer's "claimed viewing data" regarding the amount of television and/or the various programming that the viewer watches by, for example, having the viewer provide responses to relevant questions. However, when comparing the viewer's "claimed viewing data" against the audience data, the claimed viewing data typically does not match the audience data. This discrepancy between the "claimed viewing data" and the audience data may be caused by viewers remembering incorrectly the amount of time they spent watching television, failing to remember the programs that they watched, and/or entering different programming names than the programs they actually watched, for example. Thus, the "claimed viewing data" entered by the viewer is typically unreliable and/or inaccurate when measured against the gold standard of audience data.

There remains a need in the art, therefore, for methods and systems for segmenting television viewing data based upon programming level viewing for identifying viewers with similar viewing patterns of television programming. There also remains a need in the art for methods and systems for performing analysis on the segmented data and providing targeted marketing based upon the analysis.

SUMMARY OF THE INVENTION

Aspects of the present invention include methods for segmenting television audience data. The methods may include receiving program level viewing data for one or more individuals. The methods may also include creating one or more segments for the one or more individuals based upon the program level viewing data. The methods may further include combining the one or more segments into one or more groups by applying a grouping function and performing analysis on the one or more groups, and generating reports based upon the analysis.

Aspects of the present invention may also include systems for segmenting television audience data. The systems may include a module for receiving program level viewing data for one or more individuals and a module for creating one or more segments for the one or more individuals based upon the program level viewing data. The system may also include a module for combining the one or more segments into one or more groups by applying a grouping function. In addition, the system may include a module for performing an analysis on the one or more groups and module for generating one or more reports based on the analysis.

DETAILED DESCRIPTION

Aspects of the present invention relate to methods and systems for segmenting television viewers into segments (e.g., groups of data), based upon program level viewing information, such as audience data indicating which program a viewer is watching during a particular time and the share of viewing the viewer allocates to particular programs. The segments may be developed by grouping viewers with similar viewing patterns of television programming. Aspects of the present invention also include methods and systems for combining the segments together based upon common features among the viewers of the respective segments.

Aspects of the present invention further include methods and systems for performing analysis on the different generated segments. The analysis may include, for example, creating names for the various segments, identifying the types of viewers in each segment, providing a representative snapshot of the type of viewer in each segment, and identifying which products best represent the viewers of a segment.

Figure 1:
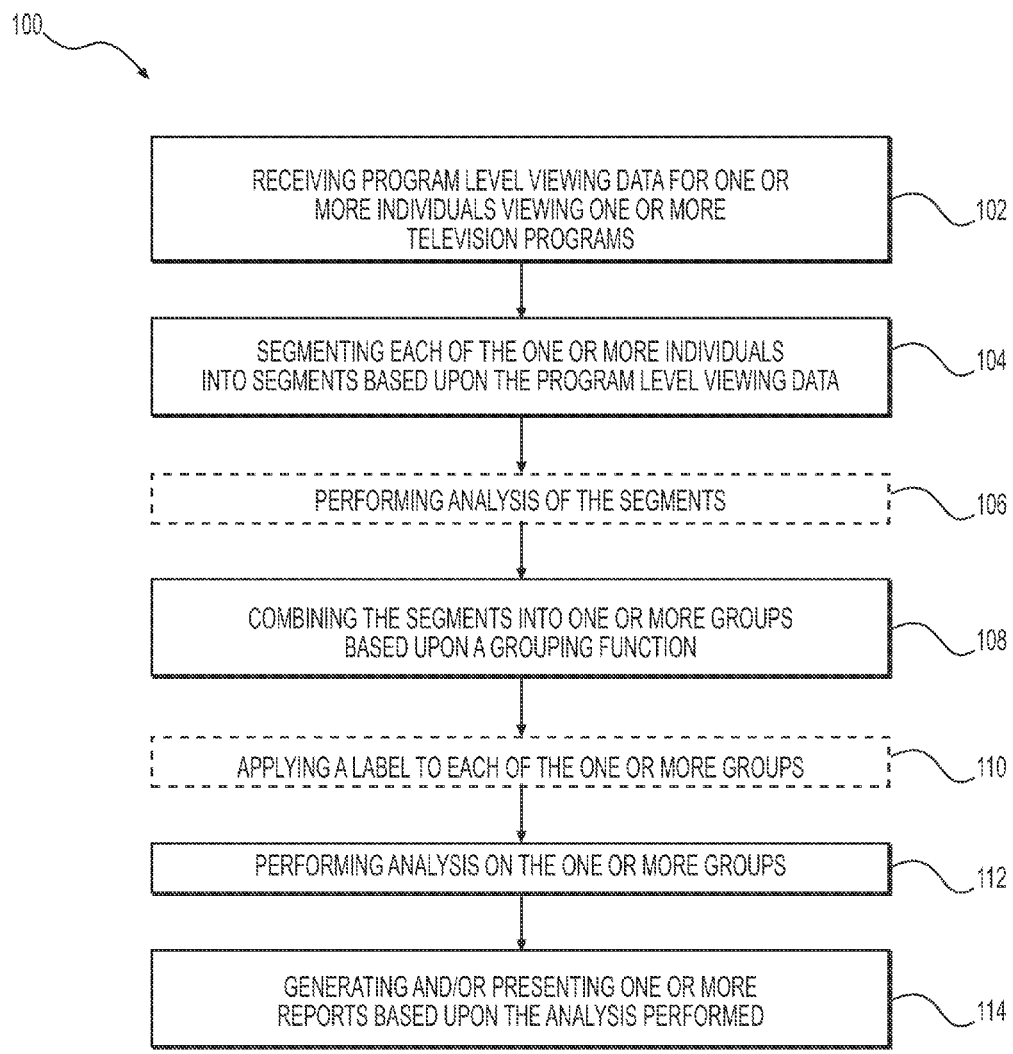
FIG. 1 illustrates an example method flow for segmenting data and performing analysis in accordance with aspects of the present invention.

Referring now to FIG. 1, therein illustrated is an example method flow 100 for segmenting data and performing analysis on the segmented data in accordance with aspects of the present invention. The method may include receiving program level viewing data for one or more individuals viewing one or more television programs 102. Program level viewing data may include, for example, the actual viewing behavior of the television viewer(s), e.g., audience data indicating which program a viewer is watching during a particular time interval and the share of viewing the viewer allocates to specific programs. The audience data may include, for example, a viewer identifier (ID), identifying the particular viewer the audience data is related to; program data indicating the particular program the viewer is watching; and/or time data indicating the time period during which the viewer is watching the program data, among other program level viewing data. Thus, the audience data may track the amount of time a viewer watches a program, the frequency of changing channels, and the number of networks/programs/channels the viewer watches, among other data. When a viewer selects a television program to watch, the viewer may provide insight into the viewer's interests, life stage, household composition, and socio-economic situation, among other insights. In an aspect, a server and/or computing device may receive the program level viewing information for one or more television viewers.

The method may also include segmenting each of the one or more individuals into segments based upon the program level viewing data 104. The segments may be developed by grouping viewers with similar viewing patterns of television programming, as discussed in more detail below in regard to FIG. 3. For example, the server may segment the received audience data associated with a group of viewers into segments based upon similar viewing patterns of the viewers.

In an aspect, the segmenting may occur using a multi-stage hierarchical segmenting algorithm, such as K-means segmenting, for breaking down the audience data into groups with the best fit. For example, the audience data may be broken down for a given large and diverse population of viewers into 300 groups of viewers, each with similar viewing patterns. Thus, segments may include viewers having similar programming behaviors and/or similar programming choices. By segmenting the individuals into groups of viewers with similar programming patterns, the segments may contain viewers with similar interests, life stages, household compositions, and socio-economic situations, among other similarities.

The method may further include combining the segments into one or more groups based upon a grouping function 108. For example, the server may group the segments of individuals together based upon a grouping function that groups viewers with similar viewing habits. Similar viewing habits may include, but are not limited to, similar networks, similar genres of television programs, and/or similar time periods of viewing television programs, among other viewing habits. The grouping function may include, but is not limited to, an algorithm, rule, fuzzy logic, or any other mechanism for combining the segments into one or more groups.

In one aspect, a share of requirements algorithm may be used in determining which segments to group together to form the larger groups. The share of requirements algorithm may, as a matter of statistical probability, determine which viewers have sufficiently similar viewing habits, as part of determining which segments to group together. The segments may be grouped together into larger groups based upon the results of the share of requirements algorithm. For example, if 300 segments are generated during the segmentation process, the 300 segments may be grouped together with sufficiently selected statistical probability (e.g., 90% confidence) to form 16 or 32 groups based upon the percentage of variations between the groups.

The method may optionally include applying a label to each of the one or more groups 210. In addition, the method may optionally include applying a label to each of the one or more segments created in 104. The label may identify the types of viewers in each of the various groups and/or provide a representative snapshot of the type of viewer in each group. The label may include, but is not limited to, a name, number, color, photograph, and/or icon, among other types of labels. In an aspect, the server may label each group with a name that identifies the type of viewer in each group based upon, for example, the audience data for the individuals within the group. For example, the label may be "Science" to identify that the viewers in the group frequently view science television programs.

The method may further include performing analysis on the one or more groups 112. The analysis may include, for example, creating names for the various segments, identifying the types of viewers in each segment, providing a representative snapshot of the type of viewers in each segment, identifying the interests of the viewers in each segment, identifying the life stage of the viewers in each segment, and identifying which products best represent the viewers of a segment. It should be appreciated that the analysis may use, for example, fusion of data between Nielsen respondent information and other respondent data information from other companies, e.g., program or network viewing associated with each viewer in the segment, demographic data associated with each viewer in the segment, and supplemental research data, e.g., Gfk MRI's (Mediamark Research and Intelligence) Survey of the American Consumer™, magazine reading data, and online behaviors, among other lifestyle behaviors and psychographic characteristics for the viewers, for generating a complete and current picture of the viewers within each segment. For example, the server may analyze the Nielsen respondent level data and other respondent level data sets from other companies for each individual in the one or more groups to determine which additional products and characteristics may best represent viewers of the group.

In addition, the method may include generating and/or presenting reports based upon the analysis of one or more groups 114. For example, the server may perform the analysis on the received data from the one or more groups and may generate one or more reports. The generated reports may include various forms of reports or presentations, and may be exported into a spreadsheet, a graph, a table, or other forms of presenting the reports, as illustrated in FIGS. 7-10, described further below.

In an aspect, a generated report may provide a description of the type of viewers within a particular group. For example, the report may include the following viewer information for the viewers of the particular group: the type of television programs watched by the viewers; networks watched by the viewers; the average age of the viewers (e.g., mean age of all individuals in the particular group); gender of the viewers; average income of the viewers; life stage of the viewers; medical products purchased by the viewers; amount of money spent on vehicles by the viewers; dining habits of the viewers; retail habits of the viewers; and types of electronics owned by the viewers, among other viewer information, as illustrated in FIGS. 7-11, for example. It should be appreciated that the reports may be generated for an individual television viewer, segment and/or group, or for multiple television viewers, segments, and/or groups.

One variation of the present invention may include using the segmentation analysis data for creating support information for advertisers or product placement, for example, based upon the segmentation analysis data. The segmentation data may be used, for example, for determining which services and/or products are likely to be used by the viewers of a particular segment, the timing for advertising various products, and the programs that may benefit from product placements by matching viewing patterns and/or behaviors of the viewers within the various segments. In an aspect, the segmentation data may generate key product categories for the group (e.g., product categories used in the last six months with a high penetration index and large market coverage). Based upon the information generated by the segmentation data, advertisers may determine which products from the key product categories to market during the programs viewed by the group to maximize the effectiveness of the advertising. In addition, the segmentation data may be used, for example, for determining the scheduling of programming based upon the viewing patterns and/or behaviors of the viewers within the various segments (e.g., if a significant market share for a segment group will likely be viewing another program in a particular time slot, a competing program may be scheduled into a different tier slot to increase viewership).

Figure 2:
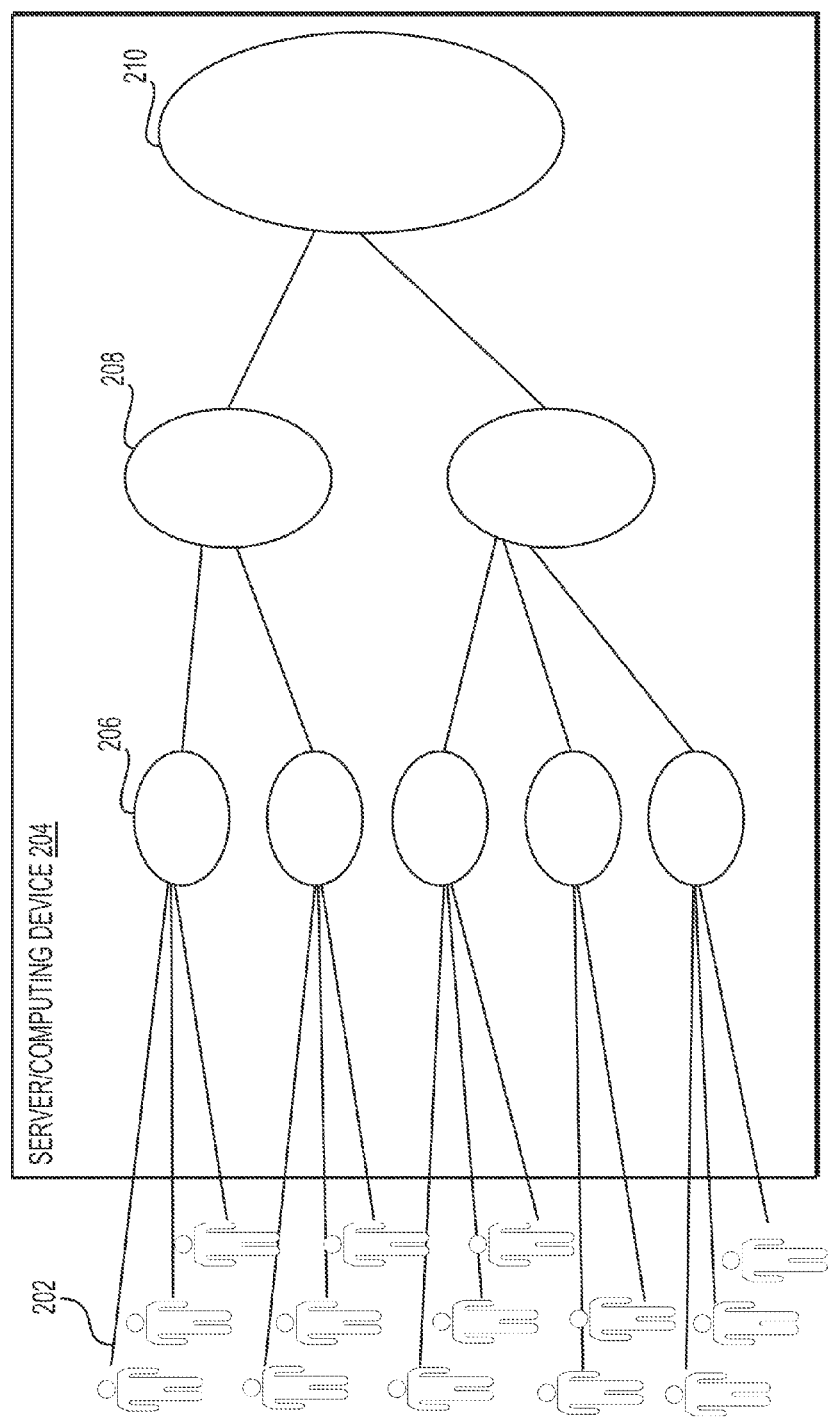
FIG. 2 illustrates a representative diagram of aspects of a system for segmenting and combining data in accordance with aspects of the present invention.

Referring now to FIG. 2, therein illustrated is a representative diagram of aspects of a system 200 for segmenting and combining data in accordance with the method described in FIG. 1 above. System 200 may include a server and/or computing device 204 which receives data from one or more television viewers 202. Server 104 may include, for example, any suitable mobile or fixed computing device connected to a network. Server 204 may receive program level viewing information from one or more television viewers 202. Program level viewing information may include, for example, the actual viewing behavior of the television viewers, e.g., audience data indicating the program(s) a viewer is watching during a particular time period and the share of viewing the viewer allocates to particular programs. In an aspect, server 204 may receive program level viewing data from other systems, such as, but not limited to, data repositories with the program level viewing data, among other ways of receiving the program level viewing data.

Server 204 may receive the program level viewing data for one or more individuals and create one or more segments 206 of individuals by grouping viewers with similar viewing patterns of television programming. For example, server 204 may place individuals who mostly watch sporting events on television into one segment 206 while placing individuals who mostly watch mysteries into a separate segment 206.

Figure 3:
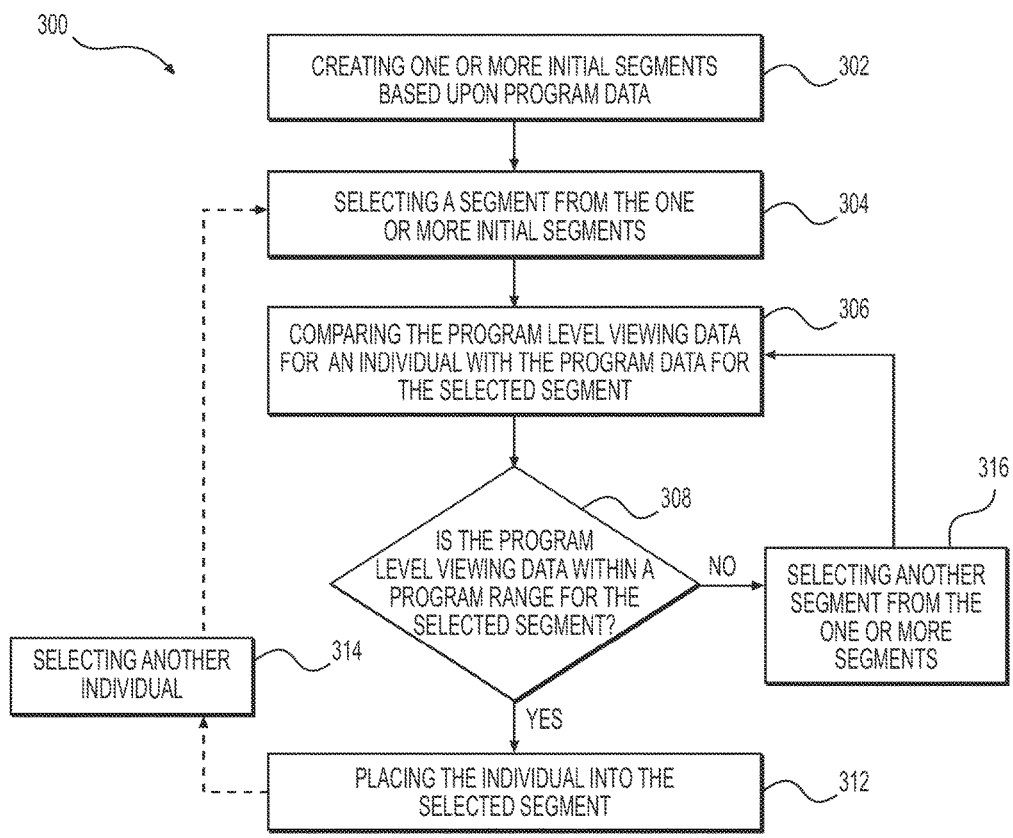
FIG. 3 illustrates an example method flow for segmenting data in accordance with aspects of the present invention.

Referring now to FIG. 3, therein illustrated is an example method 300 for segmenting data in accordance with aspects of the present invention. The method may include creating one or more initial segments based upon program data 302. In an aspect, a content provider, such as a television network, may provide program data to a server for processing. The server may use the provided program data to create a number of initial segments to account for different types of programming data provided by one or more television networks. For example, a server may create an initial set of 250 segments based upon a variety of programming data received from one or more content providers.

The method may include selecting a segment from one or more initial segments 304 and comparing the program level viewing data for an individual with the program data for the selected segment 306. For example, a server may receive program level viewing data for an individual and compare the program level viewing data with the program data for the selected segment.

The method may further include determining whether the program level viewing data for the individual is within a program range for the selected segment. The program range may include, but is not limited to, a percentage computed based upon the similarity of the program shares from the selected segment and the program viewing data for the individual. For example, the program range percentage may determine how similar the program viewing data for the individuals is to the program data of the selected segment. When considering the similarity of the program viewing data factors that may be relevant include, but are not limited to, network viewing, network loyalty, program viewing, the amount of time a viewer spends viewing a program, the time of day for viewing television programs, the amount of time a viewer spends watching television and/or the number of networks the viewer watches, among other factors for determining similarity of the program viewing.

If the program viewing data for the individual is within the program range, the method may include placing the individual into the selected segment 312. For example, if the server determines that the majority of the program shares of the viewer's program level viewing data is within the range for the selected segment (e.g., 90% of the viewer's program level viewing data matches the program data of the selected segment), the server may place the viewer into the selected segment based upon the viewer's program level viewing data. Thus, the individual may be placed into a segment based upon the actual viewing behavior of the individual and may be grouped with other individuals with similar viewing behaviors. The method may optionally select another individual 314 and proceed to 304 to select a segment from the one or more initial segments and repeat the process until all of the individuals have been placed into one or more initial segments.

If, however, the program viewing data for the individual is not within the program range, the method may include selecting another segment from the one or more segments 316 and comparing the program level viewing data for the individual with the program data for the newly selected segment 306. The method may repeat until the individual is placed a specific selected segment. In an aspect, the method may include a segment titled "other" to place individuals who are not within a program range for any one of the initial segments.

Referring back to FIG. 2, server 204 may combine the one or more segments 206 into one or more groups 208, 210 based upon a grouping function. The number of groups 208 formed may be based upon, for example, the type of analysis being performed on the programming data for each of the groups 208. For example, if the segments 206 are being combined into groups 208 for determining which services and/or products are likely to be used by the viewers of a particular group 208, a larger number of groups 208 may be formed.

Figure 4:
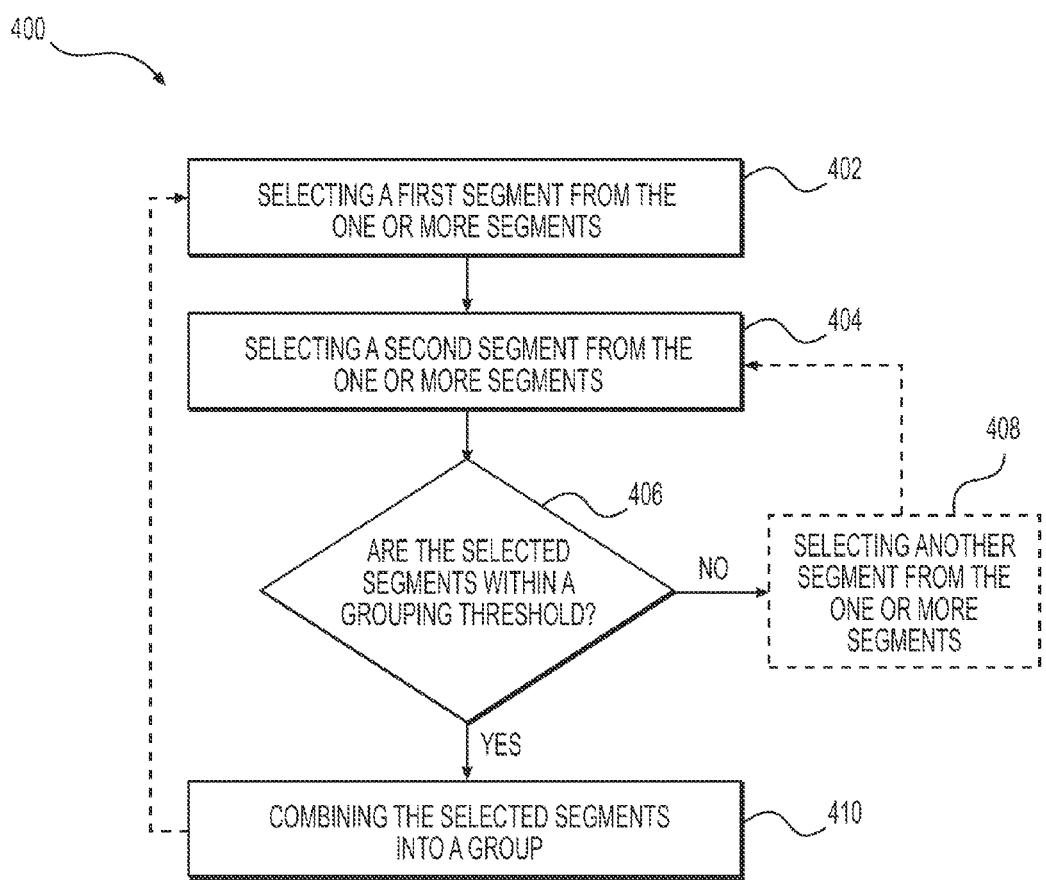
FIG. 4 illustrates an example method flow for combining the segmented data in accordance with aspects of the present invention.

Referring now to FIG. 4, therein illustrated is an example method 400 for combining the segmented data in accordance with aspects of the present invention. The method may include selecting a first segment from the one or more segments 402 and selecting a second segment from the one or more segments 404 to combine into one group. For example, a server may select two of the segments created in FIG. 3 to combine into one group.

The method may further include determining whether the selected segments are within a grouping threshold 406. The grouping threshold may include, but is not limited to, the number and/or percentage of viewers that have sufficiently similar viewing habits. Thus, the segments may be grouped together into larger groups based upon viewers that have sufficiently similar viewing habits. It should be appreciated that the grouping threshold may be determined based upon the expected end use of the program data in the groups. For example, if the expected end use is to determine the scheduling of programming based upon the viewing patterns and/or behaviors of the viewers within the various segments, the grouping threshold may be a high number and/or percentage to ensure that the formed groups have similar viewing patterns.

If the selected segments are within the grouping threshold, the method may include combining the selected segments into a group 410. If, however, the selected segments are not within the grouping threshold, the method may include selecting another segment from the one or more segments to combine into a group. It should be appreciated that the method may repeat combining different segments and/or groups together to form larger groups based upon the viewing patterns and/or behaviors of the viewers within the various segments. For example, if 300 segments are generated during the segmentation process, the 300 segments may be grouped together with a predetermined statistical probability (e.g., 90% confidence) to form 16 or 32 groups based upon the percent of variations between the groups.

Referring back to FIG. 2, it should be appreciated that various levels of groupings 208, 210 may be generated during the combination process so as to form a hierarchy of groups, e.g., a tree structure with various sizes of groups on different levels starting with smaller groups on the lower levels and working up the tree to higher levels with larger groups, with correspondingly varying associated confidence probabilities. Thus, aspects of the present invention may allow analysis of both larger number of groups correlated by a higher probability and smaller numbers of groups correlated by a lower probability, with each group's corresponding associated characteristics.

Figure 7:
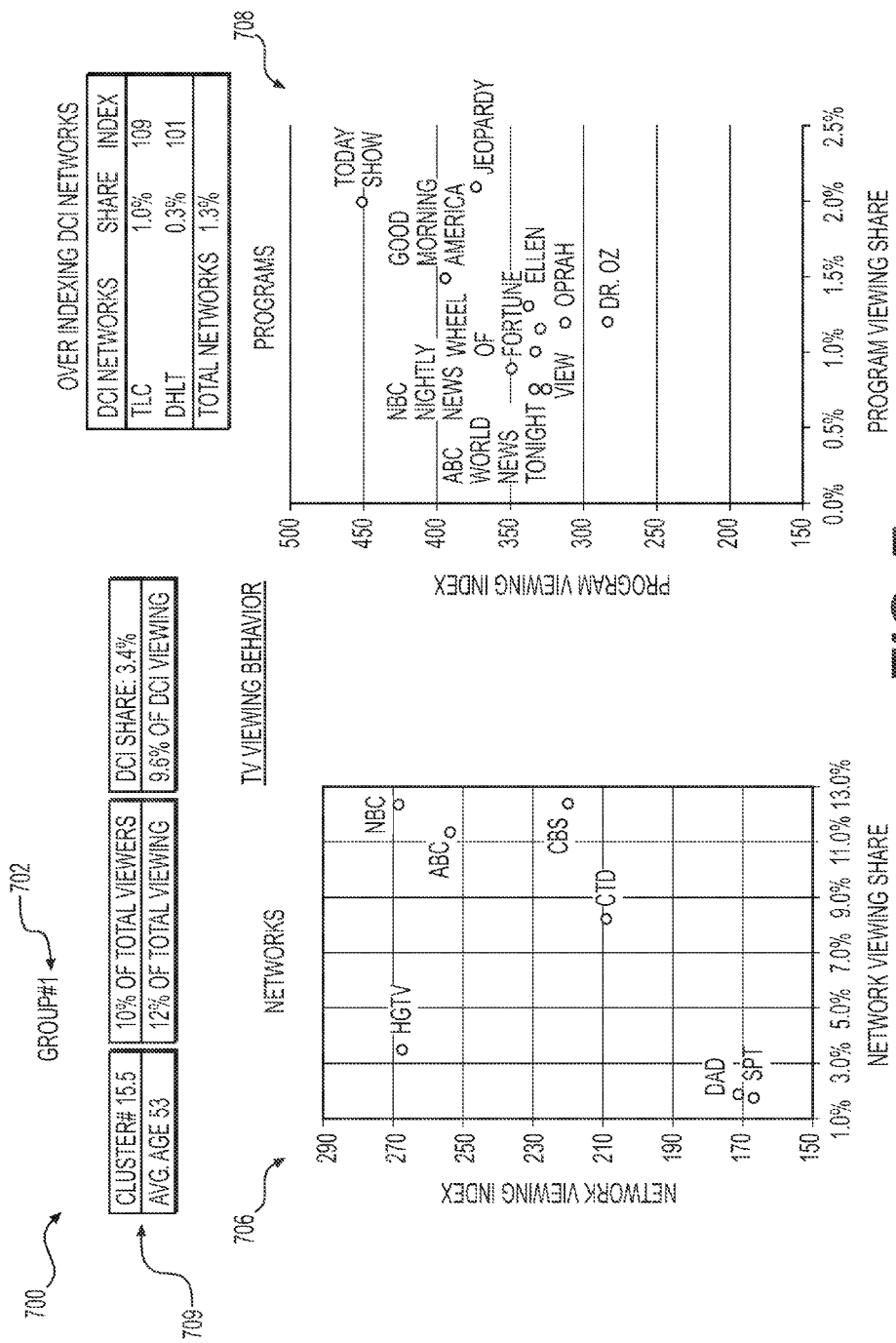
FIGS. 7-11 illustrate example generated reports in accordance with aspects of the present invention.

Referring now to FIGS. 7-11, illustrated are example reports generated in accordance with aspects of the present invention. An example report 700 presenting the television viewing behavior for a group of television viewers is illustrated in FIG. 7. Report 700 may include, for example, a name 702 for the particular group of television viewers, information 704 about the viewers, and/or graphs 706 and 708 illustrating the viewing behavior of the viewers. Information 704 about the viewers of group 702 may include, but is not limited to, the average age of the viewers; the percentage of total viewers (e.g., the number of viewers in this group as a percentage of the total viewing population); and the percentage of total viewing (e.g., the total viewing hours in this group as a percentage of total viewing in the population); among other viewer information.

Graph 706 may include, for example, the network viewing share of the various networks viewed by the individuals within group 702. Network viewing share may include, but is not limited to a percentage of the group's viewing hours to a given network. For example, graph 706 may illustrate the names of the networks viewed by the individuals within group 702 and the network viewing share percentage for each of the illustrated networks. In addition, graph 706 may compare the network viewing share of the group with the network viewing index. The network viewing index may include, for example, an index illustrating a relationship between a network's share among the group and the network's share among the total population. In addition, graph 708 may include, for example, the program viewing share of the various television programs viewed by the individuals within group 702. The program viewing share may include, but is not limited to, a percentage of the group's viewing hours given to a program. For example, graph 708 may illustrate the names of the television programs viewed by the individuals within group 702 and the program viewing share percentage for each of the illustrated television programs. Graph 708 may also compare the program viewing share with the program viewing index. The program viewing index may include, for example, an index illustrating a relationship between a program's share among the group and the program's share among the total population.

Figure 8:
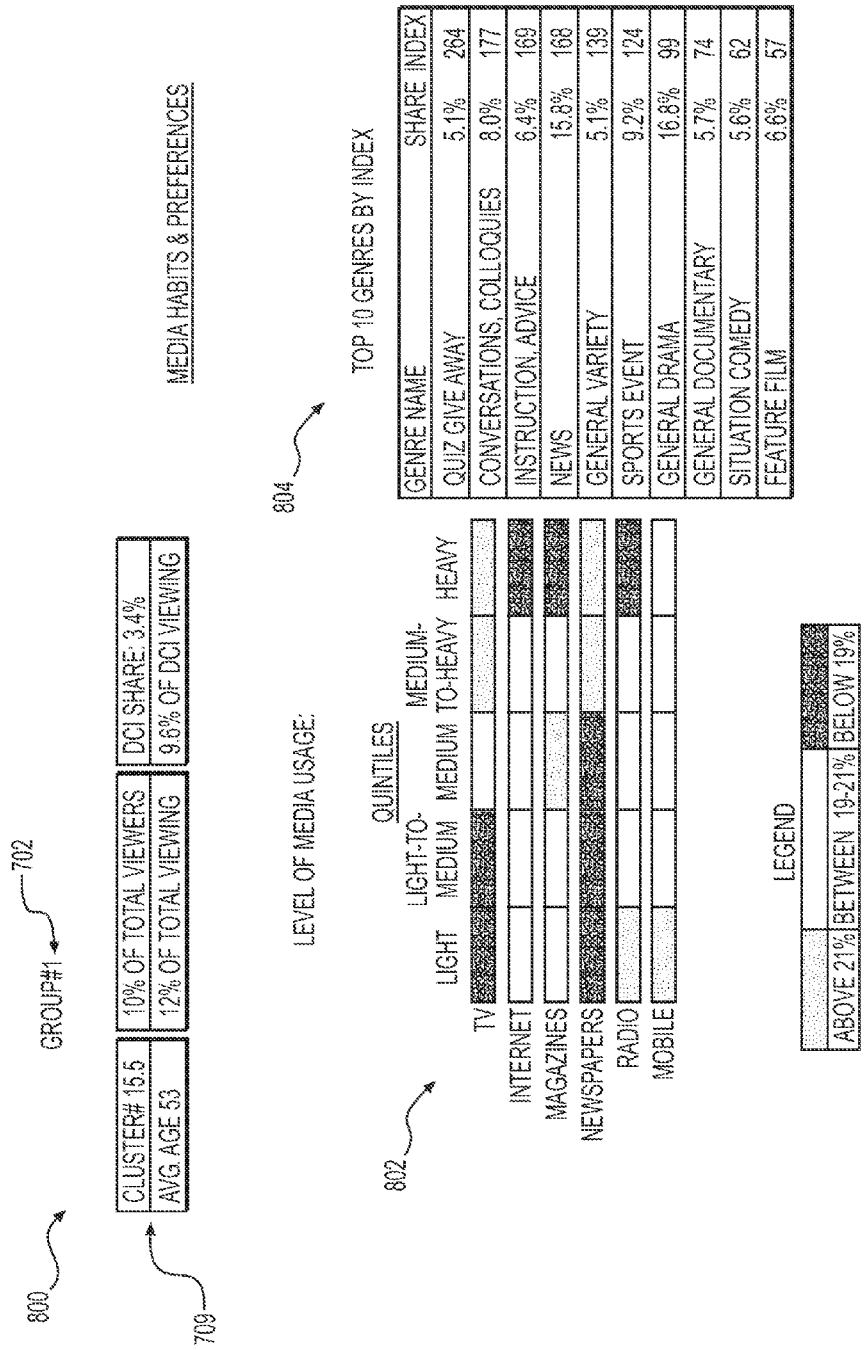

Referring now to FIG. 8, therein illustrated is an example report 800 for media usage and media habits of individuals within group 702 (FIG. 7). Report 800 may include a graph 802 illustrating the percentage of individuals within group 702 using particular media. Media may include, but are not limited to, television, internet, magazines, newspapers, radio, and mobile device, among other media usage. The percentage of individuals may be split, for example, into five levels of media usage (e.g., heavy, medium-to-heavy, medium, light-to-medium, and light). In addition, report 800 may include a list 804 of media habits and/or preferences for the individuals within group 702.

Figure 9:
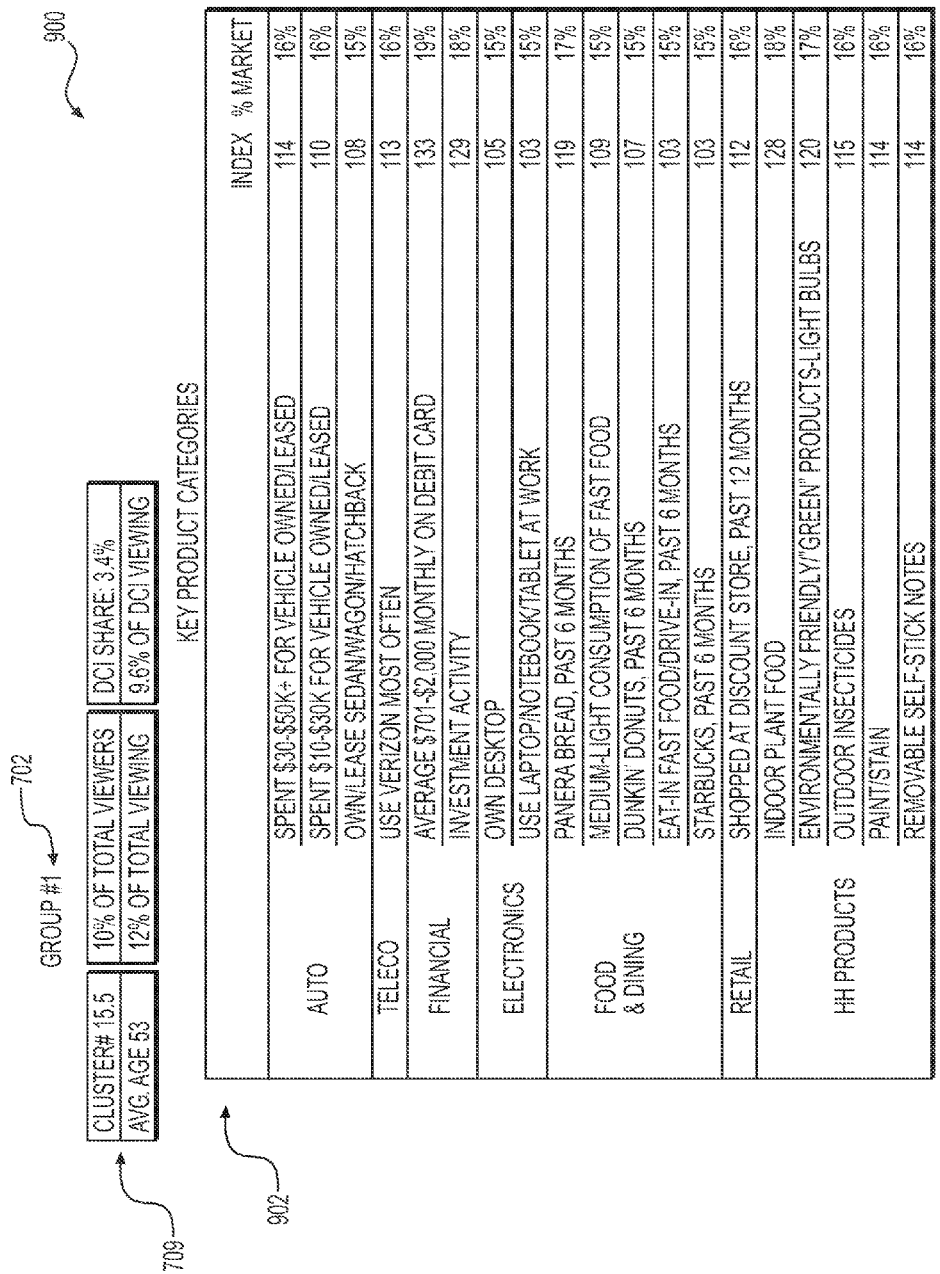

Referring now to FIG. 9, therein illustrated is an example report 900 illustrating a list 902 of product categories that are used and/or purchased by viewers within group 702 (FIG. 7). List 902 may include, for example, the amount of money spent by the viewers on automobiles and/or the model of automobiles that the viewers drive. In addition, list 902 may include, for example, the retail habits of the viewers (e.g., the amount of money charged on credit cards each month and/or the retail establishments where the viewers shop). List 902 may further include, for example, the dining habits of the viewers, such as the names of restaurants and/or coffee shops where the viewers dine. It should be appreciated that a variety of information may be presented in list 902 relating to the consumer habits of the viewers within group 702. In addition, list 902 may be used to identify which products best represent viewers of group 702.

Figure 10:
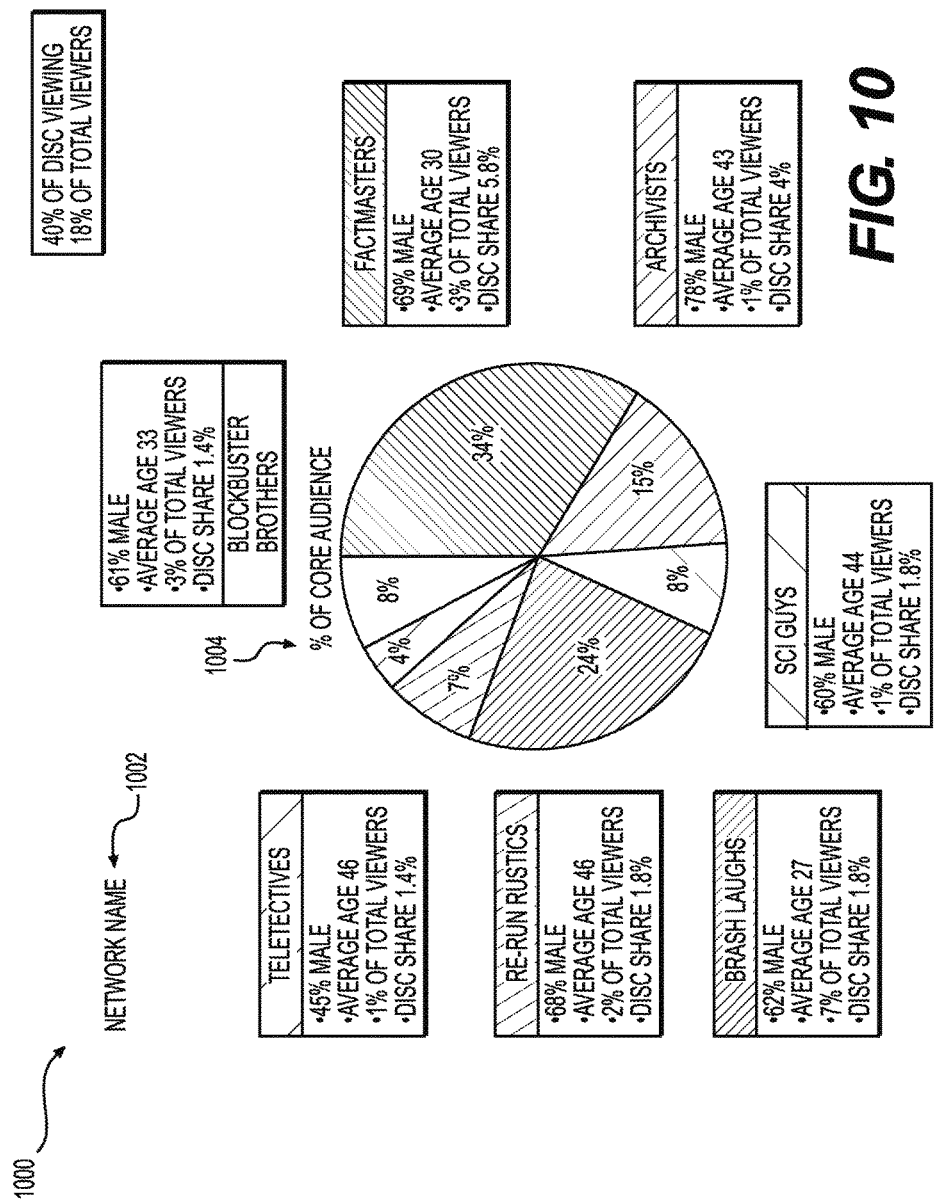

Referring now to FIG. 10, therein illustrated is an example report 1000 with a graph 1004 illustrating the percentage of the core audience for a network 1002. Core audiences may include, but are not limited to, individuals most likely to watch specific networks from among the groups generated, for example, by the process described above in FIGS. 1 and 4. For example, graph 1004 may include the percentage of the core audience along with the names of the one or more groups that define the core audience for the network 1002. In addition, graph 1004 may also include additional information about the groups comprising the core audience for the network 1002. Additional information may include, but is not limited to, the average age of the viewers and the average gender of the group, among other additional information. Report 1000 may be used, for example, by network 1002 for determining the scheduling of programming based upon the viewing patterns and/or behaviors of the viewers within the various groups (e.g., if a significant market share for a segment group will likely be viewing another program in a particular time slot, a competing program may be scheduled into a different time slot to increase viewership).

It should be appreciated that a variety of reports may be generated to aid in determining which services and/or products are likely to be used by the viewers of a particular group, the timing for advertising various products, and the programs that may benefit from product placements by matching viewing patterns and/or behaviors of the viewers within the various groups.

Figure 11:
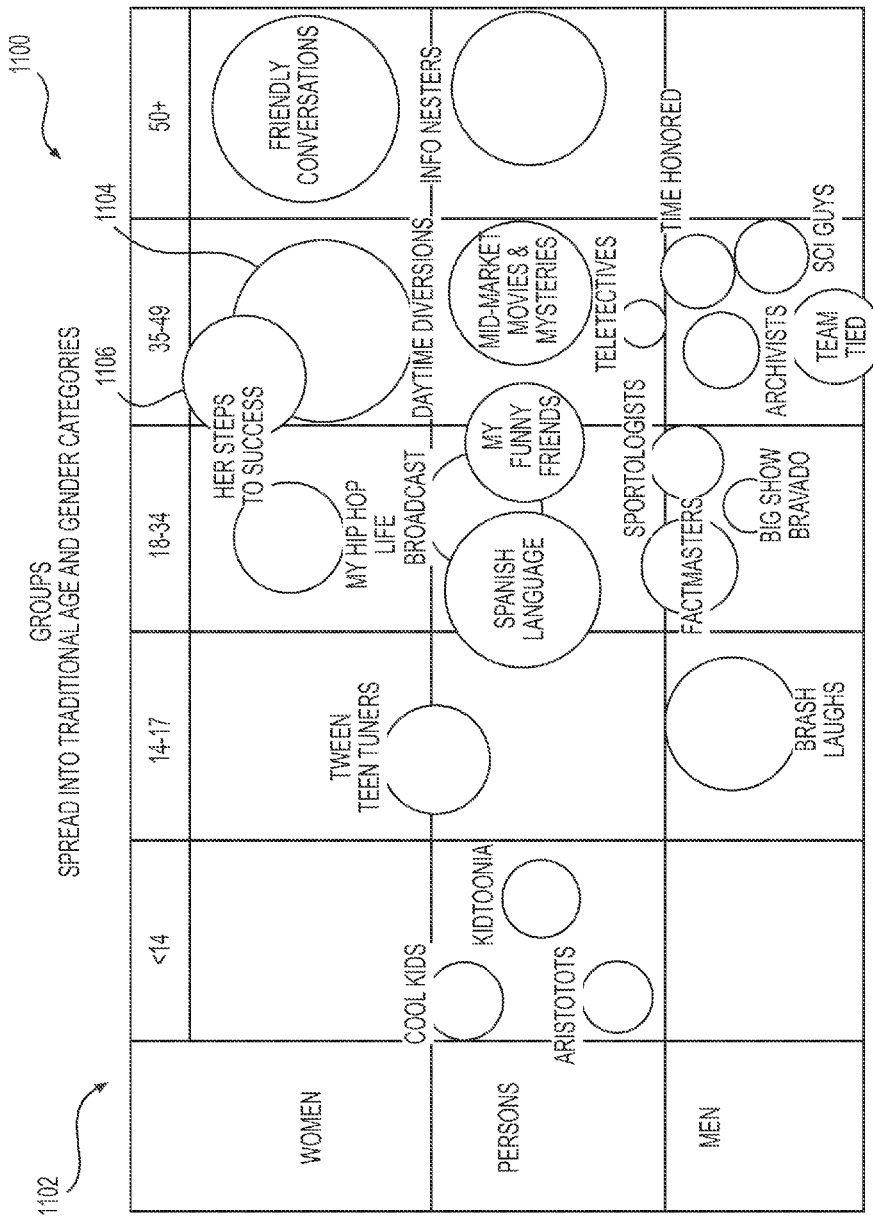

Referring now to FIG. 11, therein illustrated is an example report 1100 with a graph 1102 illustrating 20 groups spread into age and gender categories. The size of the groups illustrated in graph 1102 may be representative of, for example, each group's share of viewing. The group's share of viewing may be based upon, for example, the percentage of total viewing for the group (e.g., the total viewing hours in this group as a percentage of total viewing in the population) and/or the group's percentage of total viewers (e.g., the number of viewers in this group as a percentage of the total viewing population). In an aspect, graph 1102 may be used to provide a representative snapshot of the type of viewers in each group. For example, a user may be able to quickly determine that the viewers in groups 1104 and 1106 are mostly female in the age range of 35-49 years of age. In addition, the user may be able to quickly determine that the viewers in group 1104 provide a larger share of viewing as compared to the viewers in group 1106.

Figure 5:
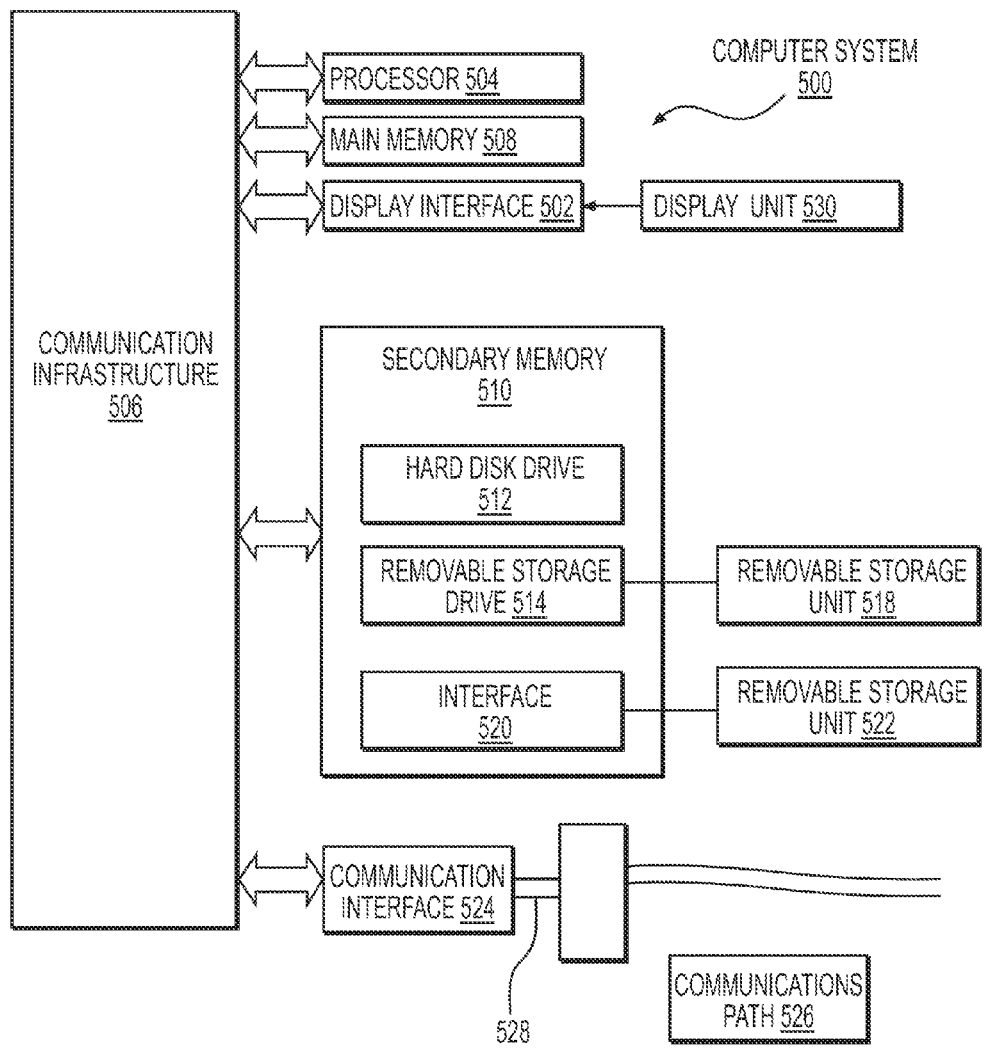
FIG. 5 illustrates various features of an example computer system for use in conjunction with aspects of the present invention.

Aspects of the present invention may be implemented using hardware, software, or a combination thereof and may be implemented in one or more computer systems or other processing systems. In an aspect of the present invention, features are directed toward one or more computer systems capable of carrying out the functionality described herein. An example of such a computer system 500 is shown in FIG. 5.

Computer system 500 includes one or more processors, such as processor 504. The processor 504 is connected to a communication infrastructure 506 (e.g., a communications bus, cross-over bar, or network). Various software aspects are described in terms of this exemplary computer system. After reading this description, it will become apparent to a person skilled in the relevant art(s) how to implement aspects of the invention using other computer systems and/or architectures.

Computer system 500 can include a display interface 502 that forwards graphics, text, and other data from the communication infrastructure 506 (or from a frame buffer not shown) for display on a display unit 530. Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518, represents a floppy disk, magnetic tape, optical disk, etc., which is read by and written to removable storage drive 514. As will be appreciated, the removable storage unit 518 includes a computer usable storage medium having stored therein computer software and/or data.

Alternative aspects of the present invention may include secondary memory 510 and may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528, which may be electronic, electromagnetic, optical or other signals capable of being received by communications interface 524. These signals 528 are provided to communications interface 524 via a communications path (e.g., channel) 526. This path 526 carries signals 528 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 580, a hard disk installed in hard disk drive 570, and signals 528. These computer program products provide software to the computer system 500. The invention is directed to such computer program products.

Computer programs (also referred to as computer control logic) are stored in main memory 508 and/or secondary memory 510. Computer programs may also be received via communications interface 524. Such computer programs, when executed, enable the computer system 500 to perform the features in accordance with aspects of the present invention, as discussed herein. In particular, the computer programs, when executed, enable the processor 510 to perform the features in accordance with aspects of the present invention. Accordingly, such computer programs represent controllers of the computer system 500.

In an aspect of the present invention where the invention is implemented using software, the software may be stored in a computer program product and loaded into computer system 500 using removable storage drive 514, hard drive 512, or communications interface 520. The control logic (software), when executed by the processor 504, causes the processor 504 to perform the functions described herein. In another aspect of the present invention, the system is implemented primarily in hardware using, for example, hardware components, such as application specific integrated circuits (ASICs). Implementation of the hardware state machine so as to perform the functions described herein will be apparent to persons skilled in the relevant art(s).

In yet another aspect of the present invention, the invention is implemented using a combination of both hardware and software.

Figure 6:
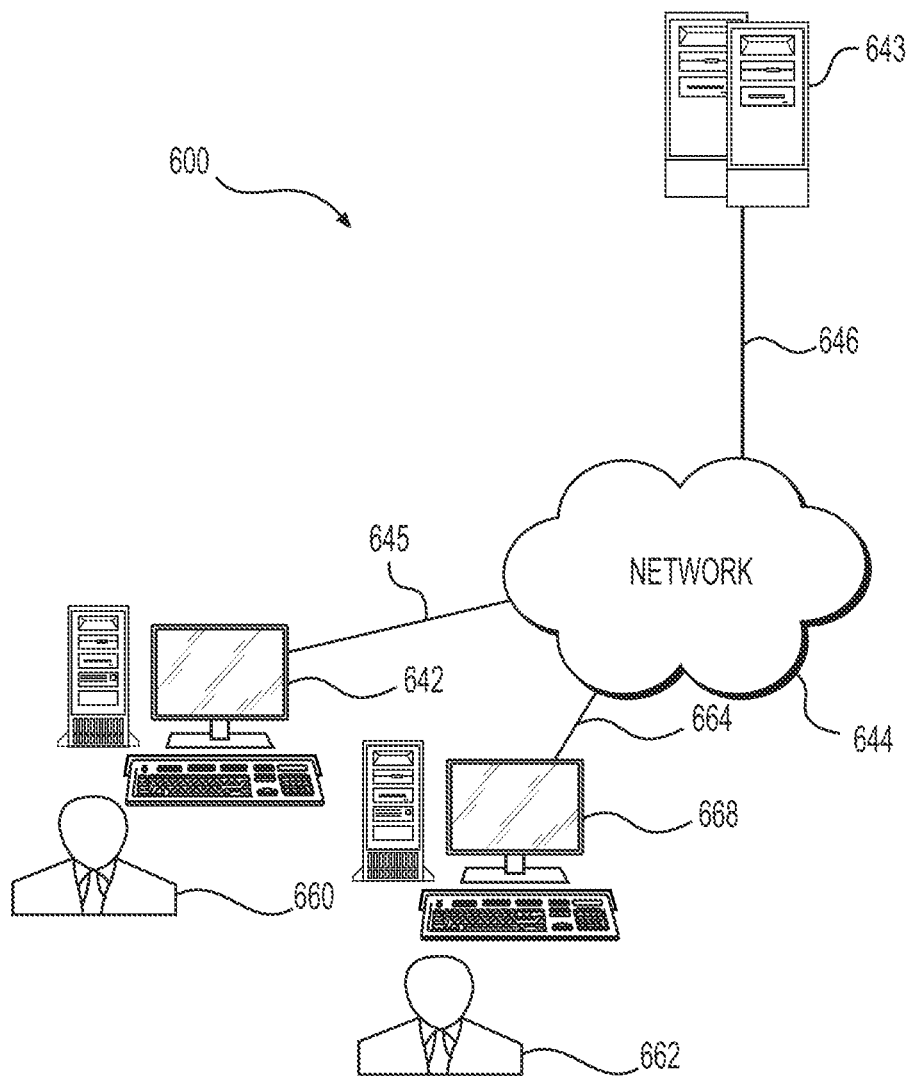
FIG. 6 illustrates an exemplary system diagram of various hardware components and other features, in accordance with aspects of the present invention.

FIG. 6 illustrates a communication system 600 usable in accordance with aspects of the present invention. The communication system 600 includes one or more accessors 660, 662 (also referred to interchangeably herein as one or more "users") and one or more terminals 642, 668. In one aspect of the present invention, data for use is, for example, input and/or accessed by accessors 660, 664 via terminals 642, 668, such as television viewing monitoring devices, personal computers (PCs), minicomputers, mainframe computers, microcomputers, telephonic devices, or wireless devices, such as personal digital assistants ("PDAs") or a hand-held wireless devices coupled to a server 643, such as a PC, minicomputer, mainframe computer, microcomputer, or other device having a processor and a repository for data and/or connection to a repository for data, via, for example, a network 644, such as the Internet or an intranet, and couplings 645, 646, 664. The couplings 645, 646, 664 include, for example, wired, wireless, or fiberoptic links. In another aspect of the present invention, the method and system of the present invention operate in a stand-alone environment, such as on a single terminal.

While aspects of the present invention have been described in connection with various features of the present invention, it will be understood by those skilled in the art that variations and modifications of the aspects of the present invention described above may be made without departing from the scope of the invention. Other aspects will be apparent to those skilled in the art from a consideration of the specification or from a practice thereof.

The invention claimed is:

1. A computer implemented method for segmenting data utilizing a share of requirement algorithm, the method comprising:
   receiving, at at least one server, program level viewing data for a plurality of individuals, the program level viewing data comprising audience data associated with each of the plurality of individuals;
   combining the audience data associated with the plurality of individuals with additional respondent level data from one or more data sources, the additional respondent level data comprising online behavior data and consumption patterns;
   creating, by the server, an initial set of viewer segments, each viewer segment comprising a subset of the plurality of individuals, based upon the received program level viewing data, the initial set of viewer segments being created by sorting the plurality of individuals by program consumption patterns;
   analyzing, by the server, the initial set of viewer segments, the analyzing comprising:
      identifying types of viewers in each segment of the initial set of viewer segments;
      providing a representative snapshots of the types of viewers of the said segment; and
      identifying which products best represent the viewers of the said segment;
   determining, by the server, a numeric viewer grouping threshold, the numeric viewer grouping threshold corresponding to a numeric variation between the initial set of viewer segments, of a viewer grouping function for grouping the initial set of viewer segments into a hierarchy of viewer groups based on the received program level viewing data of the plurality of individuals, and based upon a selected end use of the viewer segments or hierarchy of viewer groups of the plurality of individuals, wherein each viewer group of the hierarchy of viewer groups may comprise a plurality of viewer segments of the initial set of viewer segments, and the viewer grouping function comprises a share of requirement algorithm that groups the viewer segments into the viewer groups based upon the numeric viewer grouping threshold;
   associating, by the server, each viewer segment of the initial set of viewer segments with at least one viewer group of the hierarchy of viewer groups by applying the viewer grouping function with the determined numeric viewer grouping threshold to the initial set of viewer segments of the plurality of individuals; and
   analyzing, by the server, the hierarchy of viewer groups according to the selected end use.

2. The method of claim 1, further comprising:
   increasing the numeric viewer grouping threshold based on a determination that the selected end use of the program level viewing data is scheduling of programming, wherein the numeric viewer grouping threshold is a number or percentage.

3. The method of claim 1, wherein the program level viewing data comprises content viewing data of the plurality of individuals, and wherein the audience data comprises one of a viewer identifier, television program data, and time data associated with each of the television program data.

4. The method of claim 1, further comprising:
   selecting a viewer segment from the initial set of viewer segments; and placing an individual from the plurality of individuals into the selected viewer segment when the program level viewing data of the individual is within a program range for the selected viewer segment.

5. An apparatus for segmenting data, the apparatus utilizing a share of requirement algorithm, the apparatus executing a method comprising:
   receiving program level viewing data for a plurality of individuals, the program level viewing data comprising audience data associated with each of the plurality of individuals;
   combining the audience data associated with the plurality of individuals with additional respondent level data from one or more data sources, the additional respondent level data comprising online behavior data and consumption patterns;
   creating an initial set of viewer segments, each viewer segment comprising a subset of the plurality of individuals, based upon the received program level viewing data, the initial set of viewer segments being created by sorting the plurality of individuals by program consumption patterns;
   analyzing the initial set of viewer segments, the analyzing comprising:
      identifying types of viewers in each segment of the initial set of viewer segments;
      providing a representative snapshots of the types of viewers of the said segment; and
      identifying which products best represent the viewers of the said segment;
   determining a numeric viewer grouping threshold, the numeric viewer grouping threshold corresponding to a numeric variation between the initial set of viewer segments, of a viewer grouping function for grouping the initial set of viewer segments into a hierarchy of viewer groups based on the received program level viewing data of the plurality of individuals, and based upon a selected end use of the viewer segments or hierarchy of viewer groups of the plurality of individuals, wherein each viewer group of the hierarchy of viewer groups may comprise a plurality of viewer segments of the initial set of viewer segments, and the viewer grouping function comprises a share of requirement algorithm that groups the viewer segments into the viewer groups based upon the numeric viewer grouping threshold;

associating each viewer segment the initial set of viewer segments with at least one viewer group of the hierarchy of viewer groups by applying the viewer grouping function with the determined numeric viewer grouping threshold to the initial set of viewer segments of the plurality of individuals; and analyzing the hierarchy of viewer groups according to the selected end use.

6. The apparatus of claim 5, the method further comprising:

selecting a viewer segment from the initial set of viewer segments; and placing an individual from the plurality of individuals into the selected viewer segment when the program level viewing data of the individual is within a program range for the selected viewer segment.

7. The apparatus of claim 5, wherein the audience data comprises one of a viewer identifier, television program data, and time data associated with each of the television program data.

8. The apparatus of claim 5, wherein the additional respondent level data comprises one of demographic data, product purchase history data.

9. The apparatus of claim 5, further comprising:

generating targeted marketing to the plurality of individuals based upon the analysis performed.

10. A system for segmenting data utilizing a share of requirement algorithm, the system comprising:

a processor;

a user interface functioning via the processor;

and a repository accessible by the processor;

the processor executing a method comprising:

receiving program level viewing data for a plurality of individuals, the program level viewing data comprising audience data associated with each of the plurality of individuals;

combining the audience data associated with the plurality of individuals with additional respondent level data from one or more data sources, the additional respondent level data comprising online behavior data and consumption patterns;

creating an initial set of viewer segments, each viewer segment comprising a subset of the plurality of individuals, based upon the received program level viewing data, the initial set of viewer segments being created by sorting the plurality of individuals by program consumption patterns;

analyzing the initial set of viewer segments, the analyzing comprising:

identifying types of viewers in each segment of the initial set of viewer segments;

providing a representative snapshots of the types of viewers of the said segment; and identifying which products best represent the viewers of the said segment;

determining a numeric viewer grouping threshold, the numeric viewer grouping threshold corresponding to a numeric variation between the initial set of viewer segments, of a viewer grouping function for grouping the initial set of viewer segments into a hierarchy of viewer groups based on the received program level viewing data of the plurality of individuals, and based upon a selected end use of the viewer segments or hierarchy of viewer groups of the plurality of individuals, wherein each viewer group of the hierarchy of viewer groups may comprise a plurality of viewer segments of the initial set of viewer segments, and the viewer grouping function comprises a share of requirement algorithm that groups the viewer segments into the viewer groups based upon the numeric viewer grouping threshold;

associating, via the processor, each viewer segment of the initial set of viewer segments with at least one viewer group of the hierarchy of viewer groups by applying the viewer grouping function with the adjusted numeric viewer grouping threshold to the initial set of viewer segments of the plurality of individuals; and analyzing the hierarchy of viewer groups according to the selected end use.

11. The system of claim 10, the method further comprising:

selecting a viewer segment from the initial set of viewer segments; and placing an individual from the plurality of individuals into the selected viewer segment when the program level viewing data of the individual is within a program range for the selected viewer segment.

* * * * *